(12) United States Patent
Kamei et al.

(10) Patent No.: US 11,108,227 B2
(45) Date of Patent: Aug. 31, 2021

(54) METHODS AND APPARATUS FOR A BATTERY

(71) Applicant: SEMICONDUCTOR COMPONENTS INDUSTRIES, LLC, Phoenix, AZ (US)

(72) Inventors: Atsushi Kamei, Maebashi (JP); Yasuaki Hayashi, Oura-Gun (JP); Katsumi Yamamoto, Kokubunji (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 198 days.

(21) Appl. No.: 16/545,211

(22) Filed: Aug. 20, 2019

(65) Prior Publication Data

US 2019/0379202 A1 Dec. 12, 2019

Related U.S. Application Data

(63) Continuation of application No. 15/478,335, filed on Apr. 4, 2017, now Pat. No. 10,418,802.

(51) Int. Cl.
*H02H 7/18* (2006.01)
*H01M 10/42* (2006.01)
*H01M 10/48* (2006.01)
*H02H 3/00* (2006.01)

(52) U.S. Cl.
CPC ............ *H02H 7/18* (2013.01); *H01M 10/425* (2013.01); *H01M 10/48* (2013.01); *H02H 3/006* (2013.01)

(58) Field of Classification Search
CPC ....... H02H 7/18; H02H 3/006; H01M 10/425; H01M 10/48; Y02E 60/10; G01R 31/2827; G01R 31/2851
See application file for complete search history.

(56) References Cited

U.S. PATENT DOCUMENTS

| | | | |
|---|---|---|---|
| 5,767,659 A | 6/1998 | Farley | |
| 6,037,749 A * | 3/2000 | Parsonage | ............. H01M 10/48 320/132 |
| 6,185,458 B1 * | 2/2001 | Ochs | ..................... A61N 1/3937 607/5 |
| 2007/0044768 A1 | 3/2007 | Eick et al. | |
| 2010/0213960 A1 | 8/2010 | Mok et al. | |
| 2013/0021009 A1 | 1/2013 | Waltman et al. | |
| 2013/0093428 A1 | 4/2013 | Tinnemeyer | |

FOREIGN PATENT DOCUMENTS

| | | |
|---|---|---|
| JP | 2007271486 A | 10/2007 |
| JP | 2008203073 A | 9/2008 |

* cited by examiner

*Primary Examiner* — Daniel Cavallari
(74) *Attorney, Agent, or Firm* — Noblitt & Newson, PLLC; Gary W. Newson (57) ABSTRACT

A battery apparatus according to various aspects of the present invention may operate in conjunction with a power source, such as a battery. The battery apparatus may include a protection IC, a first terminal, a second terminal, and a third terminal. The power source may be selectively coupled to the battery apparatus at the second and third terminals. The power source may be capable of providing a current through the battery apparatus via one of a first current loop and a second current loop.

20 Claims, 9 Drawing Sheets

METHODS AND APPARATUS FOR A BATTERY

CROSS-REFERENCE TO RELATED APPLICATION

This application is a continuation of U.S. patent application Ser. No. 15/478,335, filed on Apr. 4, 2017, and incorporates the disclosure of the application in its entirety by reference.

BACKGROUND OF THE TECHNOLOGY

The rise in capacity of batteries requires new protection circuits to protect the battery from over-voltage or over-current situations. As the transistors operating the protection circuit become more sensitive over time, so must the calibration equipment used to calibrate the protection circuits.

SUMMARY OF THE INVENTION

A battery apparatus according to various aspects of the present invention may operate in conjunction with a power source, such as a battery. The battery apparatus may include a protection IC, a first terminal, a second terminal, and a third terminal. The power source may be selectively coupled to the battery apparatus at the second and third terminals. The power source may be capable of providing a current through the battery apparatus via one of a first current loop and a second current loop.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various voltage sensors, current sensors, current sources, voltage sources, semiconductor devices such as transistors and capacitors, and the like, which may carry out a variety of functions.

In addition, the present technology may be practiced in conjunction with any number of electrical systems and the systems described are merely exemplary applications for the technology. Further, the present technology may employ any number of conventional techniques for measuring current and voltage levels as well as data trimming processes.

Referring to FIGS. 1-5, in one embodiment, a calibration circuit 100 for calibrating the voltage and/or current of a protection IC 102 of a battery pack 105 may comprise a power source 101, a pulse generator 103, and a current source 104. The battery pack 105 may include a battery (not shown), and the protection IC 102 may comprise an internal storage unit (not shown) configured to receive and store a plurality of data related to the calibration circuit 100.

The power source 101 may provide a predetermined voltage ($V_{SET}$). For example, the power source 101 may provide an initial $V_{SET}$ which may be utilized by the calibration circuit 100 when calibrating the voltage and/or current for the protection circuit 102. The power source 101 may provide the desired signal in any appropriate manner, such as from a battery, a voltage regulator, or other suitable source. In the present embodiment, the power source 101 comprises a conventional voltage regulator for providing a selected voltage to a load.

Figure 1:
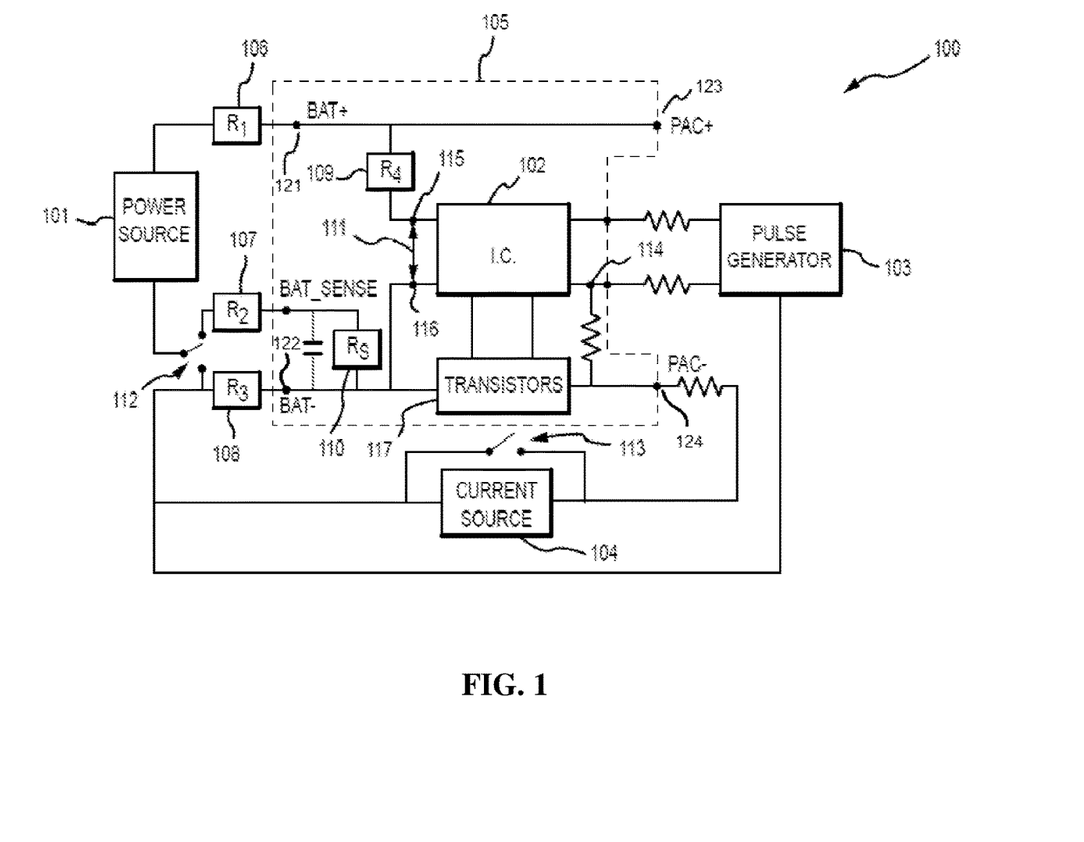
FIG. 1 is a block diagram of the calibration circuit.
Figure 2:
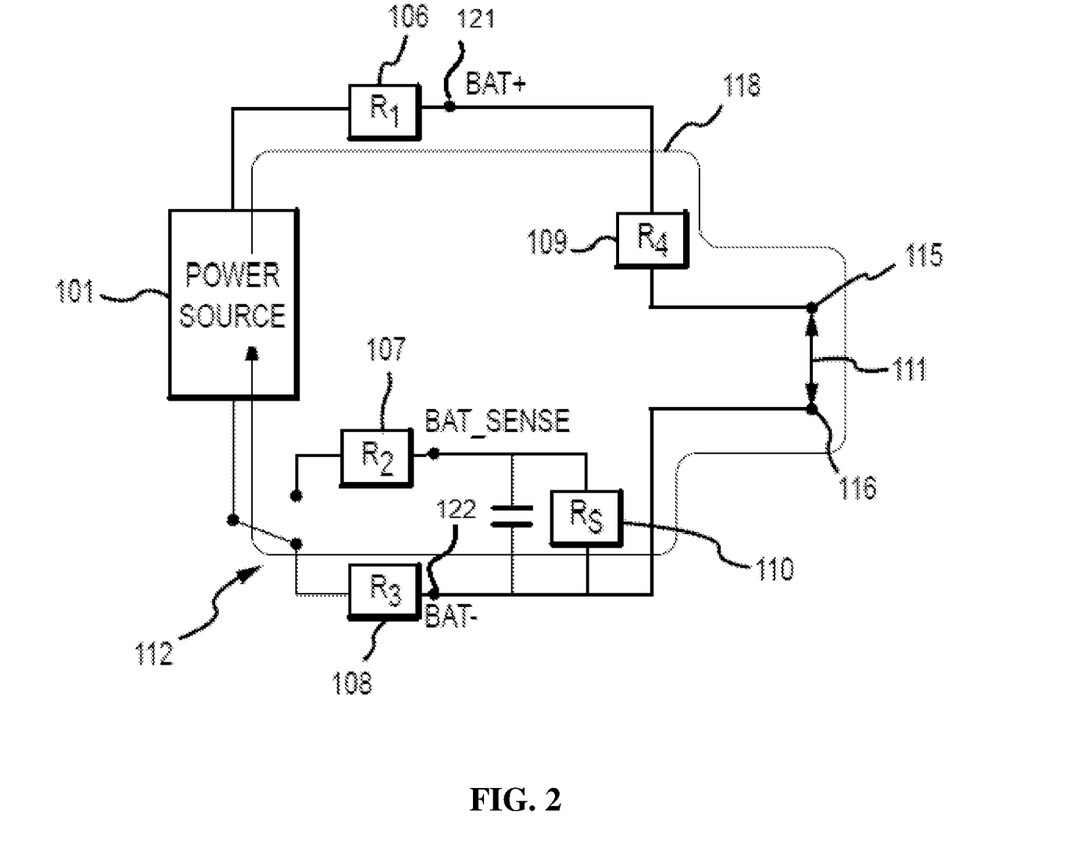
FIG. 2 is a block diagram of a first current loop.
Figure 3:
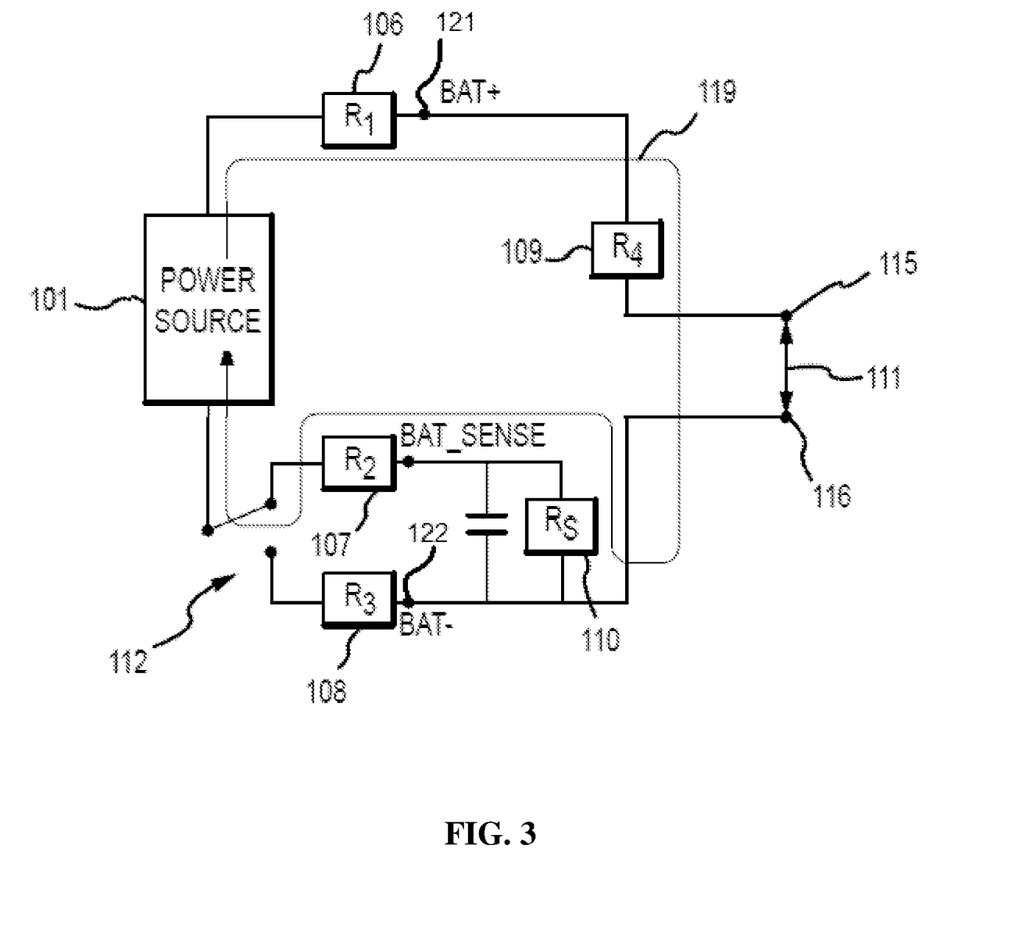
FIG. 3 is a block diagram of a second current loop.

Now referring to FIGS. 1-3, in one embodiment, the power source 101 may be selectively coupled to the protection IC 102 and provide a current to the protection IC 102 through either a first current loop 118 or a second current loop 119. The first switching device 112 may be configured to select between the first current loop 118 or the second current loop 119.

The calibration circuit 100 may utilize either the first current loop 118 or the second current loop 119, depending on various characteristics the calibration circuit 100 is attempting to calibrate. For example, the first current loop 118 may be utilized when the calibration circuit 100 calibrates the voltage of the protection IC 102, and the second current loop 119 may be utilized when the calibration circuit 100 calibrates the current of the protection IC 102.

In one embodiment, the calibration circuit 100 may operate in conjunction with a plurality of resistors 106-110 to assist in directing either the first current loop 118 and/or the second current loop 119. A subset of the resistors 106, 107, and 108 may not be applicable until another electrical component is coupled to the calibration circuit 100 (contact resistance). For example, when an electrical component is electrically coupled to resistor $R_1$ 106, $R_2$ 107, and/or $R_3$ 108, the electrical connection creates impedance in the electrical flow of the calibration circuit 100. In contrast, when no other electrical components are coupled to resistors 106, 107, and 108, no additional impedance is created in the electrical flow. Resistor $R_S$ 110 may comprise a sense resistor coupled between the power source 101 and a second terminal 116 of the protection IC 102.

In one embodiment, the battery pack 105 may comprise transistors 117 electrically coupled to the IC 102. The transistors 117 may comprise any suitable transistor(s), for example, a FET transistor. The transistors 117 may operate as switches having a plurality of operating states such as an "on" (activated) state, "off" (deactivated) state, and/or the like. The calibration circuit 100 may determine the operating state of the transistors 117. For example, the calibration circuit 100 may determine whether the transistors 117 are on/activated or off/deactivated.

In one embodiment, the battery pack 105 may comprise any suitable system or device configured to operate as a battery. The battery pack 105 may comprise a positive battery terminal (BAT+) 121 and a negative battery terminal (BAT−) 122. The battery pack 105 may further comprise a positive battery pack terminal (PAC+) 123 and a negative battery pack terminal (PAC−) 124.

In one embodiment, the protection circuit 102 may comprise two electrical terminals configured to provide an electrical contact such that the current and voltage of the calibration circuit 100 can be monitored or collected. For example, a first terminal 115 and a second terminal 116 may provide a testing point for calibrating the voltage of the protection IC 102. A third terminal 114 may be configured to provide a testing point for calibrating the current of the protection IC 102.

The pulse generator 103 provides electrical pulses. The pulse generator may comprise any suitable system or device configured to provide the calibration circuit 100 with electrical pulses. For example, the pulse generator 103 may apply a test signal to the protection IC 102.

Figure 4:
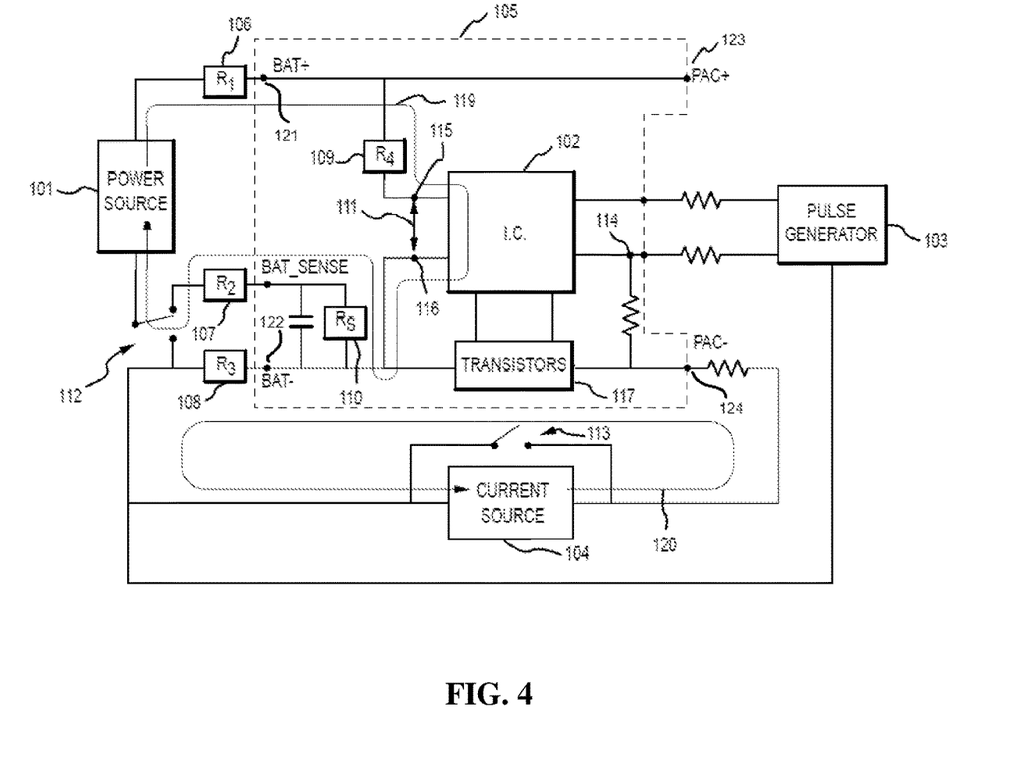
FIG. 4 is a block diagram depicting the calibration circuit configured to calibrate for current.
Figure 5:
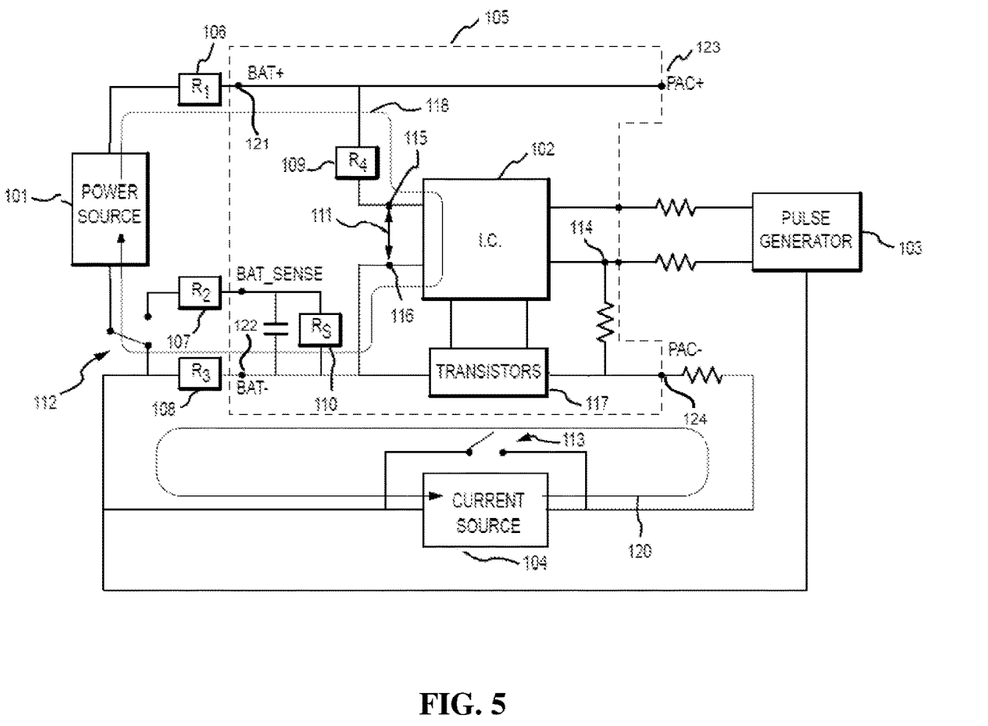
FIG. 5 is a block diagram depicting the calibration circuit configured to calibrate for voltage.

The current source 104 may comprise any suitable system or device configured to provide the calibration circuit 100 with a current. The current source 104 may be coupled between the negative pack terminal and the negative battery terminal to form a third current loop 120 through the battery pack 105 as shown in FIGS. 4 and 5. The current source 104 may be configured to be disabled or disconnected from the battery pack 105, for example with a second switching device 113. The second switching device 113 may be configured to operate as a bypass, wherein the bypass restricts the flow of the third current loop 120 and prevents the third current loop 120 from entering the battery pack 105.

Still referring to FIGS. 1-3, in one embodiment, the power source 101 may operate in conjunction with the first switching device 112 to generate either a first current loop 118 or a second current loop 119. The first switching device 112 may select between using one of the first current loop 118 or the second current loop 119.

The first current loop 118 may originate from the power source 101. The first current loop 118 may flow through at least one resistor ($R_4$) 109. The voltage between terminals 115 and 116 of the IC 102 may be designated as $V_{CC}$ 111. In an ideal configuration, the value of $V_{CC}$ 111 should be as close to the value of the $V_{SET}$ produced by the power source 101. For example, if the power source 101 is configured to produce a 3.7V $V_{SET}$, then the value of $V_{CC}$ should be as close to 3.7V as possible. As discussed below, the calibration circuit 100 may utilize the first switching device 112 to direct the first current loop 118 such that the value of $V_{CC}$ is close to the value produced by the power source 101.

In one embodiment, the first switching device 112 may be configured to be in one of two positions. The calibration circuit 100 may be configured with any suitable system or device configured to switch the positions of the first switching device 112 from a first position to a second position. The first position may comprise a "HIGH" position, and the second position may comprise a "LOW" position. When the first switching device 112 is configured in a "HIGH" position, the path of the current flowing from the power source 101 may follow that of the second current loop 119 as shown in FIG. 3. In this configuration, the second current loop 119 may originate from the power source 101 and flow through the sense resistor $R_S$ 110 coupled between the power supply and the second terminal 116 of the protection IC 102.

When the first switching device 112 is configured in a "LOW" position, the path of the current flowing from the power source 101 may follow that of the first current loop 118 as shown in FIG. 2. In this configuration, the first current loop 118 may bypass the sense resistor $R_S$ 110 and provide a direct coupling of the power source 101 to the second terminal 116 of the protection IC 102.

Now referring to FIGS. 5 and 6-9, in one embodiment, the calibration circuit 100 may be configured to calibrate the protection IC 102 for either voltage or current. The calibration circuit 100 may selectively couple the power source 101 to the protection IC 102 through either the first current loop 118 or the second current loop 119 via the first switching device 112 depending on the characteristic (voltage or current) being calibrated.

Figure 6:
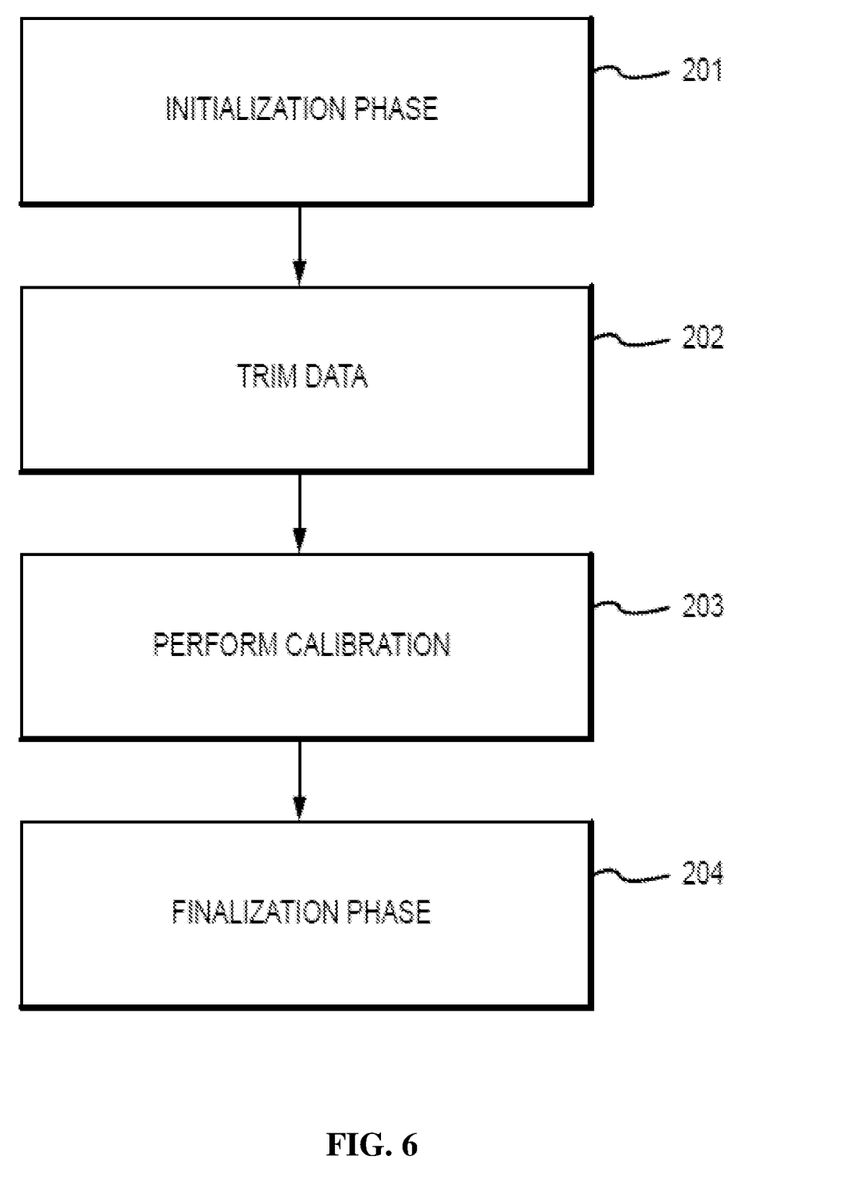
FIG. 6 is a high level flow chart of the process utilized by the calibration circuit to calibrate the voltage or the current.

Prior to the calibration phase, the calibration circuit 100 may first begin an initialization phase (201). After the initialization phase (201), the calibration circuit 100 may trim the $V_{CC}$ voltage data 111 (202). Once the $V_{CC}$ voltage data 111 has been trimmed, the calibration circuit 100 may perform calibration of the IC 102 (203). Afterwards, the calibration circuit 100 may begin a finalization phase (204).

In one embodiment, the initialization phase (201) may comprise providing the current source 104 and power source 101 with an initial set of settings (205). The initial settings may comprise any suitable settings for utilizing the calibration circuit 100. For example, the initial settings may comprise setting the value of $V_{SET}$ for the power source 101 as well as configuring the current level produced by the current source 104.

Figure 7:
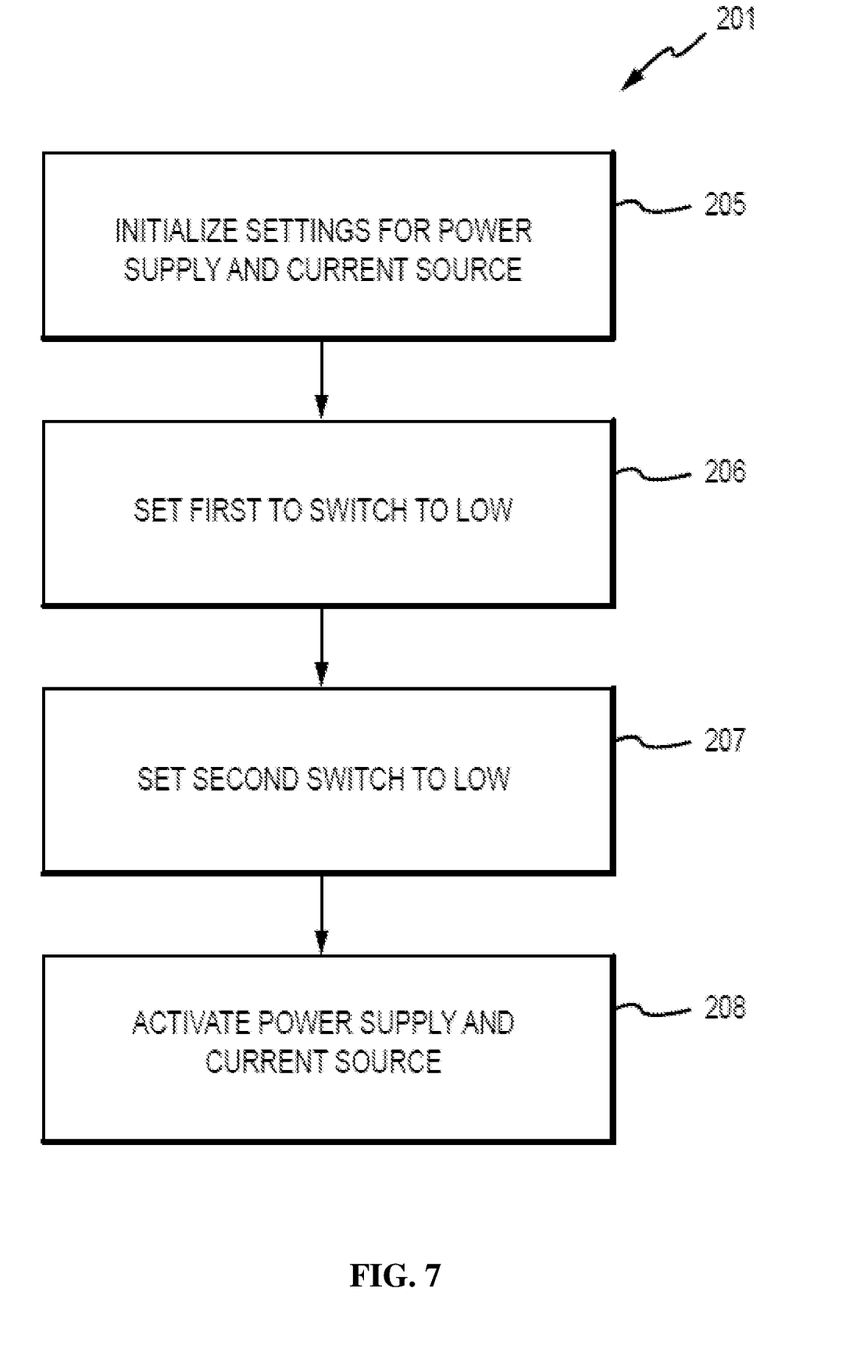
FIG. 7 is a detailed flow chart of the initialization phase utilized by the calibration circuit for calibrating the voltage.

Referring now to FIG. 7, in one embodiment, the initialization phase (201) may include the calibration circuit 100 setting the first switching device 112 to a "LOW" position (206). As previously discussed above, when the first switching device 112 is set in the "LOW" position, a current path resembling the first current loop 118 can be observed flowing through the calibration circuit 100 as shown in FIG. 6. Furthermore, as discussed above, in this configuration, the first current loop 118 bypasses resistor $R_S$ 110.

In one embodiment, the calibration circuit 100 may also set the second switching device 113 to a "LOW" position (207) during the initialization phase (201). When the second switching device 113 is set in a "LOW" position, the second switching device 113 closes and the current path produced by the current source 104 is bypassed/prevented from flowing into battery pack 105.

In one embodiment, the initialization phase may include activating the power source 101 and/or current source 104 (208), such as after both the first switching device 112 and second switching device 113 have been set into their respective "LOW" positions. The power source 101 and the current source 104 may be activated using the initial set of settings. The power source 101 and current source 104 may be activated in any order. For example, in one instance, the power source 101 may be activated prior to activating the current source 104. In another example, the current source 104 may be activated prior to activating the power source 101.

Now referring to FIGS. 6-9, the calibration circuit 100 may be configured to trim the $V_{CC}$ voltage data 111 (202), such as after the initialization phase (201). In one embodiment, the data to be trimmed may comprise an 8-bit value corresponding to a detected $V_{CC}$ voltage across terminals 115 and 116 of the protection IC 102. The trimmed data may be configured to be stored within a storage unit (not shown) communicatively coupled to the protection IC 102 and/or the calibration circuit 100.

Figure 9:
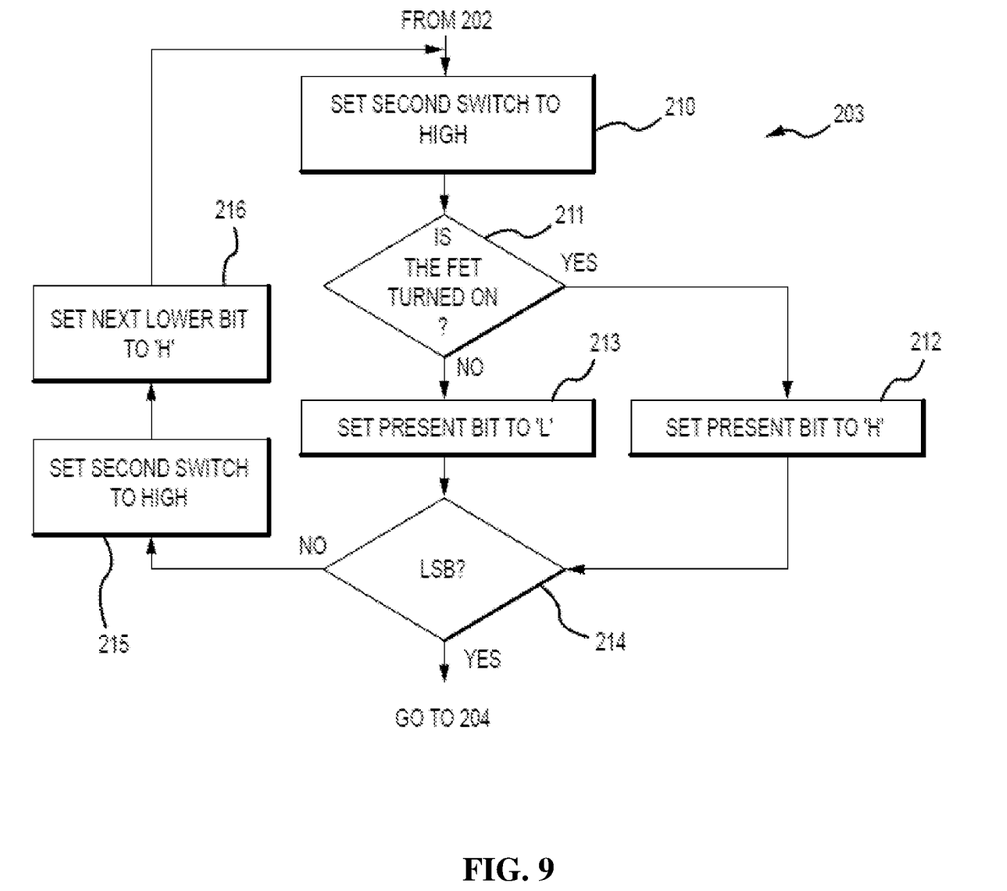
FIG. 9 is a detailed flow chart illustrating the data trimming process utilized by the calibration circuit.

In one embodiment, all bits within the 8-bit voltage value may be set to "LOW" (00000000). The second switching device 113 may be selectively set in the "HIGH" position, opening the second switching device 113 to couple the current source 104 to the protection IC 102 through the third current loop 120 (210).

The calibration circuit 100 may determine the operating state of the transistors 117 (211), such as after the third current loop 119 has been selectively coupled to the current source 104. If the transistors 117 are determined to be on or active, then the current bit of the 8-bit value corresponding to the voltage may be set to "HIGH" (corresponding to a value of 1) (212). If the transistors 117 are determined to be off or inactive, then the present bit of the 8-bit value corresponding to the voltage may be set to "LOW" (corresponding to a value of 0) (213).

Next, the calibration circuit 100 determines whether additional iterations are needed or if the trimming process has been completed by determining the binary position of the next data bit in the 8-bit voltage data. In this particular example, because the detected voltage value is represented using an 8-bit value, the process may be repeated up to eight times (once for each bit of the eight possible bits). The calibration circuit 100 may be configured to check with the least significant bit of the 8-bit detected voltage value that is being trimmed (214). If the calibration circuit 100 determines that the current bit being trimmed is the least significant bit (214), then the calibration circuit 100 may be configured to initiate the finalization phase (204).

If the calibration circuit 100 determines that the bit to be trimmed is not the least significant bit, then the calibration circuit 100 may change the position of the second switching device 113 from "LOW" to "HIGH" (215). Changing the position of the second switch to "HIGH" may result in the third current path 120 being permitted to flow through the calibration circuit 100 again.

After setting the second switch to a "HIGH" position (215), the calibration circuit 100 may set the next lower bit in the 8-bit value corresponding to the voltage value to "H" (corresponding to the value of 1) (216). The calibration circuit 100 may then be configured to repeat the above process. The process may be repeated by the calibration circuit 100 until all eight bits of the 8-bit value have been trimmed.

In one embodiment, the calibration circuit 100 may be configured to store the 8-bit value in the internal storage unit (not shown) of the IC 102. Other components may access the calibration circuit 100 and obtain the value from the IC 102.

Now referring to FIG. 5, in one embodiment, the power source 101 may be configured to facilitate a 3 µA current ($I_{CC}$), resistors $R_1$ 106 and $R_3$ 108 may comprise 50 mΩ resistors, resistor $R_4$ may comprise a 1 kΩ resistor, resistor $R_S$ may comprise a 500Ω, and the third current path 120 may comprise a 10 A current ($I_{CS}$). The value of $V_{CC}$ 111 may be measured as 4.39695V. The value of $V_{SET}$ may be calculated according to Equation 1 below:

$$V_{SET} = V_{CC} + I_{CC}*R_1 + I_{CC}*R_4 + (I_{CC}+I_{CS})*R_3 \quad \text{(Equation 1)}$$

Using the values from above to calculate the value of $V_{SET}$:

$$V_{SET} = 4.39695\text{ V} + 3\text{ µA}*50\text{ mΩ} + 3\text{ µA}*1\text{ kΩ} + (3\text{ µA} + 1\text{ mA})*50\text{ mΩ}$$

Thus, the value of $V_{SET}$ is approximately 4.4V.

Figure 8:
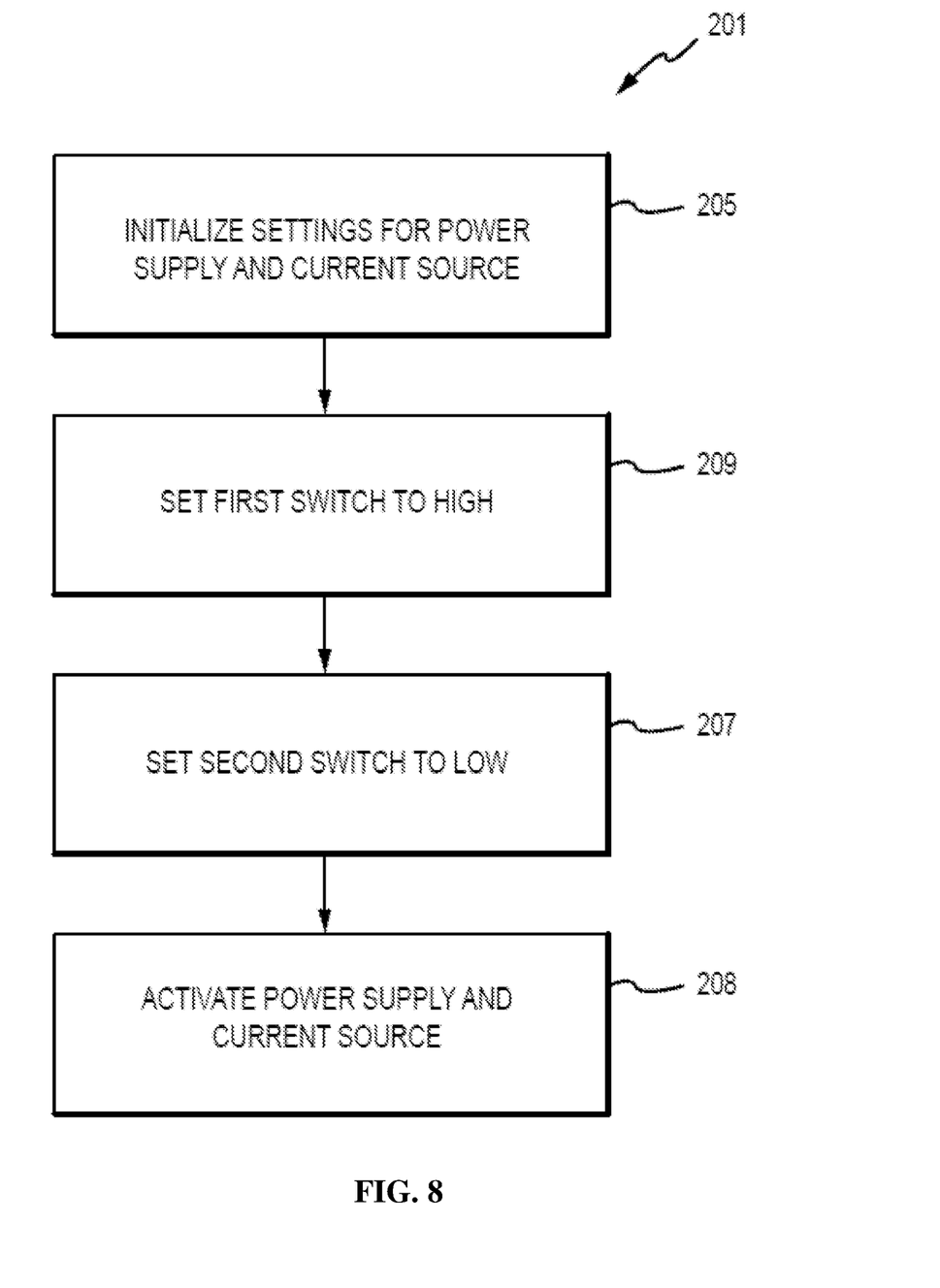
FIG. 8 is a detailed flow chart of the initialization phase utilized by the calibration circuit for calibrating the current.

Now referring to FIGS. 4 and 8, in one embodiment, the calibration circuit 100 may calibrate the current of the protection circuit 102. Calibrating the current may comprise substantially the same process described above, with a few differences. First, to calibrate the current, the calibration circuit 100 may switch the first switching device 112 to a "HIGH" position (209). As discussed above, when the first switching device 112 is configured in the "HIGH" position, the current path may be represented by the second current loop 119.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. A battery apparatus having a first terminal, a second terminal, and a third terminal, comprising:
   an integrated circuit connected to the first, second, and third terminals;
   a first current path from the first terminal, across the integrated circuit, through a resistor, and to the second terminal;
   a second current path from the first terminal, across the integrated circuit, and to the third terminal, wherein the second current path bypasses the resistor; and
   a switch selectively connected to the second and third terminals.

2. The battery apparatus according to claim 1, wherein the first terminal is configured to connect to a positive terminal of a power source.

3. The battery apparatus according to claim 1, wherein the second and third terminals are configured to selectively connect to a negative terminal of a power source.

4. The battery apparatus according to claim 1, wherein the resistor comprises:
   a first end connected to the second terminal; and
   a second end connected to the third terminal.

5. The battery apparatus according to claim 4, wherein the second end of the resistor is also connected to the integrated circuit.

6. The battery apparatus according to claim 1, wherein the battery apparatus is further configured to receive a signal from a pulse generator at a fourth terminal.

7. The battery apparatus according to claim 1, wherein the battery apparatus is further configured to connect to an external current source at a fifth terminal.

8. A method for operating a battery system having a first terminal, a second terminal, a third terminal and a power supply, comprising:
   generating a first current through a first current loop, wherein the first current flows:
      from a positive terminal of the power supply to the first terminal;
      from the first terminal, across a resistor, and to the second terminal; and
      from the second terminal to a negative terminal of the power supply;
   generating a second current through a second current loop, wherein the second current flows:
      from the positive terminal of the power supply to the first terminal;
      from the first terminal to the third terminal; and
      from the third terminal to the negative terminal of the power supply;
      wherein the second current loop bypasses the resistor.

9. The method according to claim 8, further comprising disconnecting the power supply from the second terminal with a switch.

10. The method according to claim 9, further comprising connecting the power supply to the third terminal with the switch.

11. The method according to claim 8, wherein the resistor comprises:
   a first end connected to the second terminal; and
   a second end connected to the third terminal.

12. The method according to claim 8, wherein the first and second currents flow through an integrated circuit having a protection function to monitor at least one of a voltage, the first current, and the second current.

13. A system, comprising:
   a power supply comprising a positive terminal and a negative terminal;
   a control circuit, connected to the power supply, comprising:
      a first terminal, a second terminal, and a third terminal;
      a protection circuit connected to the first, second, and third terminals;
      a resistor connected to the second and third terminals;
      wherein the control circuit is:
         connected to the positive terminal of the power supply via the first terminal; and
         selectively connected to the negative terminal of the power supply via one of: the second terminal and the third terminal;
   a first current loop comprising: the power supply, the first terminal, the protection circuit, the resistor, and the second terminal; and
   a second current loop comprising: the power supply, the first terminal, the protection circuit, and the third terminal, wherein the second current loop bypasses the resistor.

14. The system according to claim 13, wherein the resistor comprises:
   a first end connected to the second terminal; and
   a second end connected to the third terminal.

15. The system according to claim 14, wherein the second end of the resistor is also connected to the protection circuit.

16. The system according to claim 13, wherein the control circuit is further configured to receive a signal from a pulse generator at a fourth terminal.

17. The system according to claim 13, wherein the control circuit is further configured to connect to an external current source at a fifth terminal.

18. The system according to claim 13, further comprising a switch connected to the negative terminal of the power supply and configured to selectively connect the negative terminal to the second terminal and the third terminal.

19. The system according to claim 13, wherein the first current loop is configured to flow a first current:
   from the positive terminal of the power supply to the first terminal;
   from the first terminal, through the protection circuit, across a resistor, and to the second terminal; and
   from the second terminal to the negative terminal of the power supply.

20. The system according to claim 13, wherein the second current loop is configured to flow a second current:
   from the positive terminal of the power supply to the first terminal;
   from the first terminal, through the protection circuit, and to the third terminal; and
   from the third terminal to the negative terminal of the power supply.

* * * * *